(12) United States Patent
Martin et al.

(10) Patent No.: US 9,709,302 B2
(45) Date of Patent: Jul. 18, 2017

(54) REFRIGERATION SYSTEM WITH ABSORPTION COOLING

(71) Applicant: Hill Phoenix, Inc., Conyers, GA (US)

(72) Inventors: J. Scott Martin, Conyers, GA (US);
Shitong Zha, Conyers, GA (US);
Jeffrey Newel, Snellville, GA (US);
Timothy E. Lukes, Rye, NY (US);
Willis L. McCullough, Boise, ID (US)

( * ) Notice: Subject to any disclaimer, the term of this patent is extended or adjusted under 35 U.S.C. 154(b) by 217 days.

(21) Appl. No.: 14/653,783

(22) PCT Filed: Dec. 19, 2013

(86) PCT No.: PCT/US2013/076382
§ 371 (c)(1),
(2) Date: Jun. 18, 2015

(87) PCT Pub. No.: WO2014/100330
PCT Pub. Date: Jun. 26, 2014

(65) Prior Publication Data
US 2015/0345835 A1    Dec. 3, 2015

Related U.S. Application Data

(60) Provisional application No. 61/745,047, filed on Dec. 21, 2012.

(51) Int. Cl.
*F25B 15/00*         (2006.01)
*F25B 15/10*         (2006.01)
(Continued)

(52) U.S. Cl.
CPC ............. *F25B 15/006* (2013.01); *F25B 7/00* (2013.01); *F25B 9/008* (2013.01); *F25B 15/06* (2013.01);
(Continued)

(58) Field of Classification Search
CPC .......... F25B 15/006; F25B 15/10; F25B 7/00; F25B 15/06; F25B 25/02; F25B 2400/0403; F25B 2400/061; F25B 40/02
See application file for complete search history.

(56) References Cited

U.S. PATENT DOCUMENTS 3,314,247 A * 4/1967 Aronson ................. F25B 15/06
165/158
4,300,623 A * 11/1981 Meckler ................ F24F 3/0522
165/210
(Continued)

FOREIGN PATENT DOCUMENTS

KR    10-2012-0004442 A    2/2012
KR    10-2012-0010659 A    2/2012

OTHER PUBLICATIONS

International Search Report and Written Opinion for PCT Application No. PCT/US2013/076382, mailed Mar. 27, 2014, 8 pages.
(Continued)

*Primary Examiner* — Emmanuel Duke
(74) *Attorney, Agent, or Firm* — Foley & Lardner LLP (57) ABSTRACT

A refrigeration system for use with refrigerated LT and MT display cases in facilities such as supermarkets, has an absorption chiller that uses waste heat from a nearby source to provide cooling to the refrigeration system to take advantage of the synergy and improve overall efficiency of the refrigeration system. The cooling provided by the absorption chiller may be in the form of a coolant (e.g. water, glycol, water-glycol mixture, etc.) that circulates between the chiller and one or more of a pre-cooler, sub-cooler or condenser in the refrigeration system in a manner that uses waste heat from a nearby source to reduce the need for installed condensing capacity in the refrigeration system and improve thermal efficiency and obtain cost savings.

10 Claims, 4 Drawing Sheets

(51) Int. Cl.
   *F25B 7/00*    (2006.01)
   *F25B 9/00*    (2006.01)
   *F25B 15/06*   (2006.01)
   *F25B 25/02*   (2006.01)
   *F25B 1/10*    (2006.01)
   *F25B 5/02*    (2006.01)
   *F25B 40/02*   (2006.01)

(52) U.S. Cl.
   CPC .............. *F25B 15/10* (2013.01); *F25B 25/02* (2013.01); *F25B 1/10* (2013.01); *F25B 5/02* (2013.01); *F25B 40/02* (2013.01); *F25B 2309/061* (2013.01); *F25B 2400/0403* (2013.01); *F25B 2400/061* (2013.01); *F25B 2400/075* (2013.01); *F25B 2400/13* (2013.01); *F25B 2400/23* (2013.01); *Y02B 30/62* (2013.01)

(56) References Cited

U.S. PATENT DOCUMENTS

| | | |
|---|---|---|
| 5,687,579 A | 11/1997 | Vaynberg |
| 2005/0097918 A1 | 5/2005 | Thurman |
| 2010/0300135 A1 | 12/2010 | Otake et al. |

OTHER PUBLICATIONS

International Preliminary Report on Patentability and Written Opinion for PCT Application No. PCT/US2013/076382 Dated Jun. 23, 2015, 6 pages.

\* cited by examiner

REFRIGERATION SYSTEM WITH ABSORPTION COOLING

CROSS-REFERENCE TO RELATED APPLICATIONS

The present Application is a National Stage of International Application No. PCT/US2013/076382, filed Dec. 19, 2013, which claims the benefit of priority under 35 U.S.C. §119(e)(1) of U.S. Provisional Patent Application No. 61/745,047, titled "Refrigeration System with Absorption Cooling" and filed on Dec. 21, 2012, the disclosures of which are incorporated herein by reference in their entirety.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The present disclosure relates generally to the field of a refrigeration system using absorption cooling. The present disclosure relates more particularly to a refrigeration system for a facility such as a supermarket, etc. that uses waste heat from the facility (or other location, such as an adjacent or nearby facility that produces waste heat, such as in a power generation system, etc. that may be used as a heat source in an absorption cooling device to provide a source of cooling to the refrigeration system. The use of absorption cooling from a source of waste heat is intended to improve the overall efficiency of the refrigeration system by pre-cooling hot compressed refrigerant before a condensation stage, or sub-cooling a condensed refrigerant after a condensing stage, or as a primary or supplemental source of cooling in the condensing stage.

Refrigeration systems that provide cooling to temperature controlled display devices (e.g. cases, merchandisers, etc.) in supermarkets or similar facilities typically operate independently from the facility's sources of waste heat, or from waste heat that is generated and available from nearby facilities (e.g. from power generation, etc.). It would be desirable to use an available source of waste heat to improve the efficiency of such refrigeration systems.

SUMMARY

One embodiment of the disclosure relates to a refrigeration system for use with refrigerated Lt and MT display cases in facilities such as supermarkets and the like, having an absorption cooling device (e.g. chiller, etc.) that uses waste heat from a nearby source (e.g. power generation, turbines, furnaces, heaters, etc.) and provides cooling to the refrigeration system to take advantage of the synergy and improve overall efficiency of the refrigeration system. The cooling provided by the absorption chiller may be in the form of a coolant (e.g. water, glycol, water-glycol mixture, etc.) that circulates between the chiller and one or more of a pre-cooler, sub-cooler or condenser in the refrigeration system in a manner that uses waste heat from a nearby source to reduce the need for installed condensing capacity in the refrigeration system and improve thermal efficiency and obtain cost savings.

BRIEF DESCRIPTION OF THE DRAWINGS

The disclosure will become more fully understood from the following detailed description, taken in conjunction with the accompanying figures, wherein like reference numerals refer to like elements, in which:

FIG. 2 is a schematic representation of a direct expansion (DX) refrigeration system using a hydrofluorocarbon (HFC) refrigerant and having an LT portion and an MT portion, and an absorption chiller that receives a source of waste heat and provides cooling to sub-cool the condensed refrigerant in the MT portion and to condense the refrigerant in the LT portion, according to another exemplary embodiment. The absorption chiller is intended to permit the use of more efficient air-cooled condensers in the refrigeration system (rather than conventional liquid-cooled condensers) and may be staged as the primary source of cooling or condensing for the refrigerant, and the air-cooled condenser may be configured as a secondary source of cooling that may provide supplement cooling on an as-needed basis (e.g. during warmer weather, summer months, or other high-load conditions).

DETAILED DESCRIPTION

Referring to the FIGURES, several embodiments of a refrigeration system, shown by way of example for use with refrigerated display cases in facilities such as supermarkets and the like, having an absorption cooling device (e.g. chiller, etc.) that uses waste heat from a nearby source (e.g. power generation, turbines, furnaces, heaters, etc.) and provides cooling to the refrigeration system to take advantage of the synergy and improve overall efficiency of the refrigeration system. The cooling provided by the absorption chiller may be sufficient to serve as a primary source of refrigerant cooling or condensing during certain modes of operations (or during certain seasonal or daily ambient temperature variations), and other cooling devices may be provided as a secondary source of cooling to act as a "back-up" and provide supplemental cooling or condensing when needed. According to certain embodiments, the amount of cooling provided by the absorption chiller is sufficient to permit the secondary source of cooling to be an air-cooled device (such as an air-cooled condensing unit, fan-coil unit, etc.) rather than a water-cooled device. Further, since absorption cooling that uses a nearby source of waste heat can serve as a reliable cooling source for the refrigeration system, according to the present embodiments, it is no longer necessary to size the condenser equipment for a maximum heat load condition. Using absorption cooling technology, the condenser may now be "undersized" to a certain degree due to the cooling contribution of the absorption chiller, thus improving efficiency and saving cost in equipment and installation. Although the refrigeration system with absorption cooling is shown and described with reference to certain specific embodiments illustrated by way of example in FIGS. 1-4, other refrigeration systems and other refrigerants are adaptable for use with the absorption cooling device and are intended to be within the scope of this disclosure.

Figure 1:
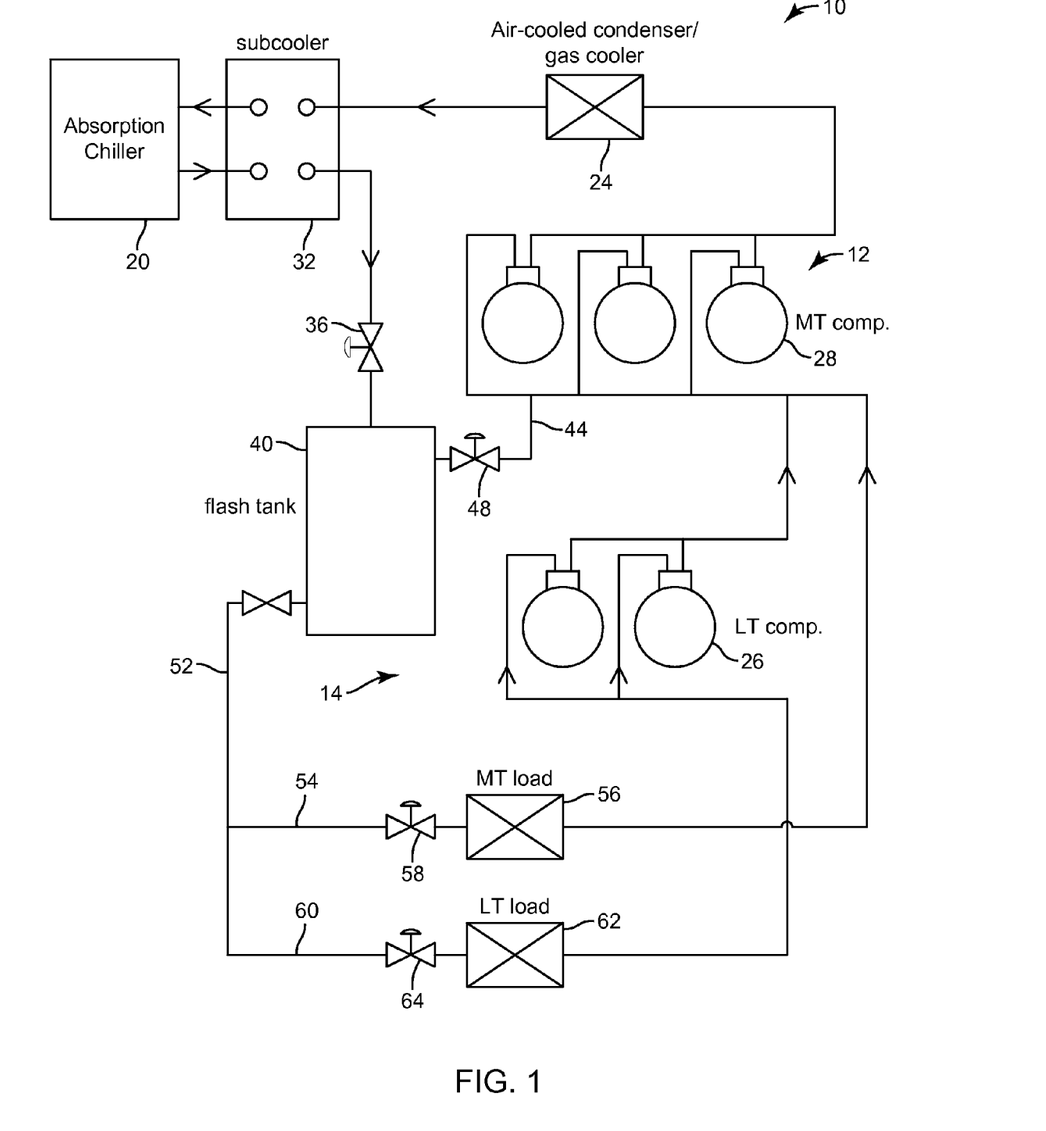
FIG. 1 is a schematic representation of a CO2 booster refrigeration system having a low temperature (LT) portion and a medium temperature (MT) portion, and an absorption chiller that receives a source of waste heat and provides cooling to sub-cool (or condense if not already condensed) a compressed CO2 refrigerant that is discharged from an air-cooled condenser or gas cooler in the MT portion, according to an exemplary embodiment.

Referring to FIG. 1, a CO2 booster refrigeration system 10 having a low temperature (LT) portion 14 and a medium temperature (MT) portion 12, and an absorption chiller 20 that receives waste heat from a nearby source and provides cooling to sub-cool (or condense if not already condensed) a compressed CO2 refrigerant that is discharged from an air-cooled condenser 24 or gas cooler in the MT portion 12, according to an exemplary embodiment. The MT portion 12 of the CO2 booster refrigeration system 10 is shown to include MT compressor(s) 28 that discharge a CO2 refrigerant to an air-cooled condenser 24 or gas cooler. The CO2 refrigerant is then routed through a sub-cooler 32 that receives a coolant from the absorption chiller 20 in a circulating coolant loop between the sub-cooler 32 and the absorption chiller 20, and sub-cools the CO2 refrigerant. The sub-cooled CO2 refrigerant then passes through an expansion valve 36 where the CO2 refrigerant is expanded to a lower temperature liquid and vapor mixture that is received in a flash tank 40. A flash gas line 44 with a flash gas bypass valve 48 is connected between the vapor portion of the flash tank 40 and the suction of the MT compressors 28, and the flash gas bypass valve 48 operates to bypass CO2 refrigerant vapor to the suction of the MT compressors 28 as-needed to control/maintain a desired CO2 pressure in the flash tank 40.

The liquid CO2 refrigerant in the flash tank 40 is routed through a liquid supply line 52 to a first branch 54 for MT loads 56 (e.g. MT refrigerated display cases, shown for simplicity as a single MT load, etc.). The flow of the liquid CO2 refrigerant through the MT loads 56 may be regulated by a supply or control valve 58. The liquid CO2 refrigerant in the flash tank is also routed through a liquid supply line to a second branch for LT loads 62 (e.g. LT freezer/display cases, shown for simplicity as a single LT load, etc.). The flow of the liquid CO2 refrigerant through the LT loads 62 may be regulated by an expansion valve 64 that expands the liquid CO2 refrigerant to a lower temperature vapor (e.g. saturated, vapor, etc.). Vaporized CO2 refrigerant from the MT loads 56 is directed to the suction of the MT compressors 28 and vaporized CO2 refrigerant from the LT loads 62 is directed to the suction of the LT compressors 26, that discharge a higher pressure CO2 refrigerant gas to the suction of the MT compressors 28 to complete the refrigeration cycle.

Figure 2:
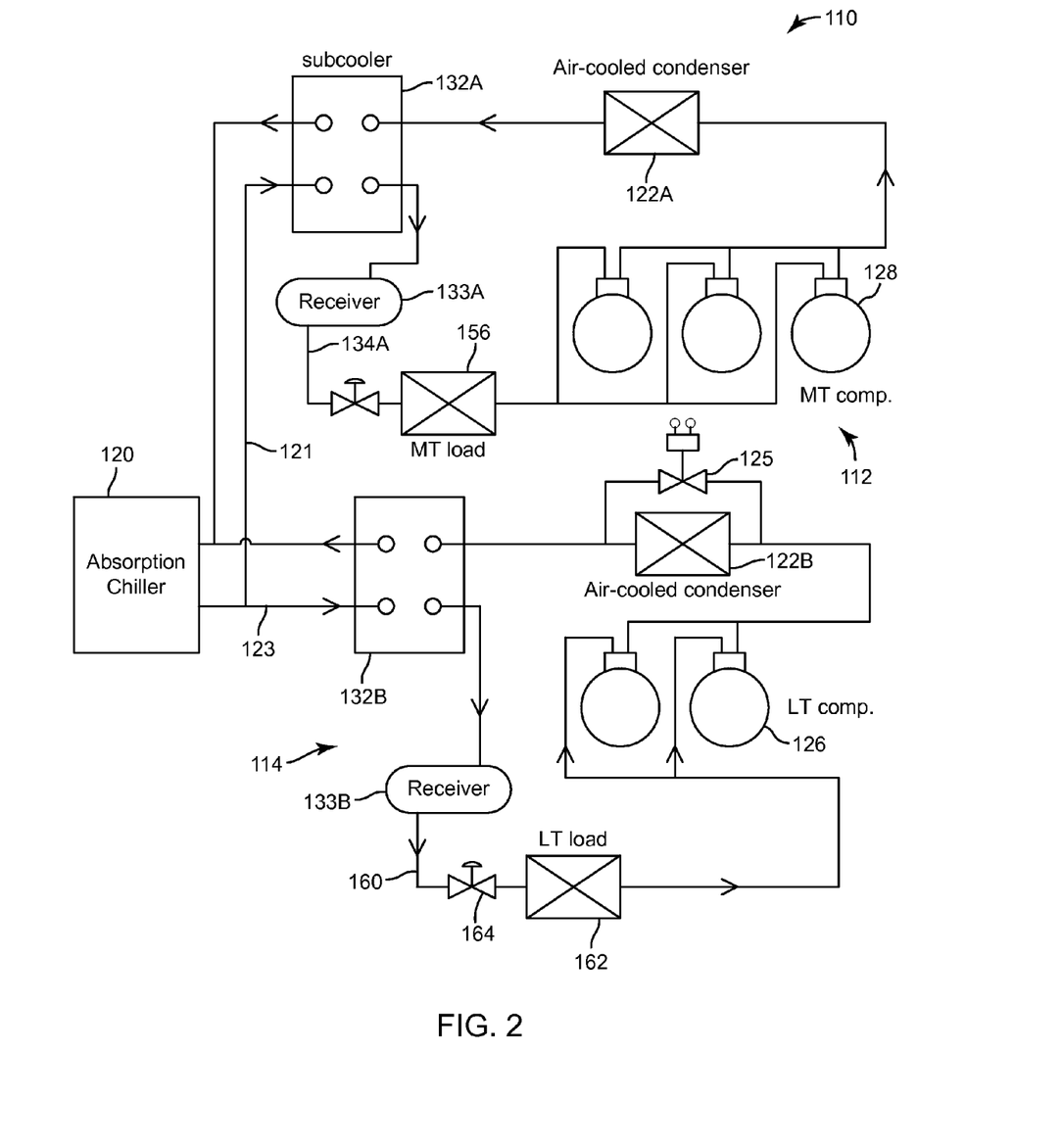

Referring to FIG. 2, a direct expansion (DX) refrigeration system 110 using a hydrofluorocarbon (HFC) refrigerant and having an LT portion 114 and an MT portion 112, and an absorption chiller 120 that receives a source of waste heat and provides cooling to sub-cool the condensed refrigerant in the MT portion 112 and to condense the refrigerant in the LT portion 114, according to another exemplary embodiment. The absorption chiller 120 is intended to permit the use of more efficient air-cooled condensers 122A, 122B in the refrigeration system 110 (rather than conventional liquid-cooled condensers) and may be staged as the primary source of cooling or condensing for the refrigerant, and the air-cooled condenser 120 may be configured as a secondary source of cooling that may provide supplement cooling on an as-needed basis (e.g. during warmer weather, summer months, or other high-load conditions).

Referring further to FIG. 2, the absorption chiller 120 has a first MT branch 121 that directs coolant through a circulating loop to an MT sub-cooler 132A that sub-cools the refrigerant that is condensed in the MT portion 112. The sub-cooled liquid refrigerant is then directed through a receiver 133A and a supply line to MT loads 156 (e.g. MT refrigerated display cases, shown for simplicity as a single MT load, etc.). HFC refrigerant gas from the MT loads 156 is then directed to the suction of the MT compressors 128 to complete the MT refrigeration cycle. The absorption chiller 120 also has a second LT branch 123 that directs coolant through a circulating loop to an LT condenser/sub-cooler 132B that acts primarily to condense the refrigerant discharged from the LT compressors 126. In the event that cooling from the absorption chiller 120 is insufficient during high loading conditions to condense all of the refrigerant from the LT compressors 126, an air-cooled condenser 122B is provided with a bypass valve 125 as a back-up to provide supplemental cooling. During "normal" conditions, the absorption chiller 120 provides sufficient cooling to condensor/sub-cooler to condense all of the refrigerant and the bypass valve 125 is open to direct the refrigerant away from the back-up condenser 122B. As supplemental cooling is needed for condensation (or as may be desired for sub-cooling), the refrigerant is also admitted into the back-up condenser 122B. According to other embodiments, the role of the condenser/sub-cooler 132B and the air-cooled condenser 122B may be reversed, where the air-cooled condenser 122B is the primary condenser, and bypasses refrigerant through the bypass valve 125 during low-load conditions to the sub-cooler/condenser 132B. The condensed or sub-cooled refrigerant is then directed through a receiver 133B and a supply line 160 to the LT loads 162 (e.g. LT freezer/display cases, shown for simplicity as a single LT load, etc.), and the vaporized refrigerant discharged from the LT loads 162 is directed back to the LT compressors 126 to complete the cycle for the LT portion 114 of the refrigeration system 110.

Figure 3:
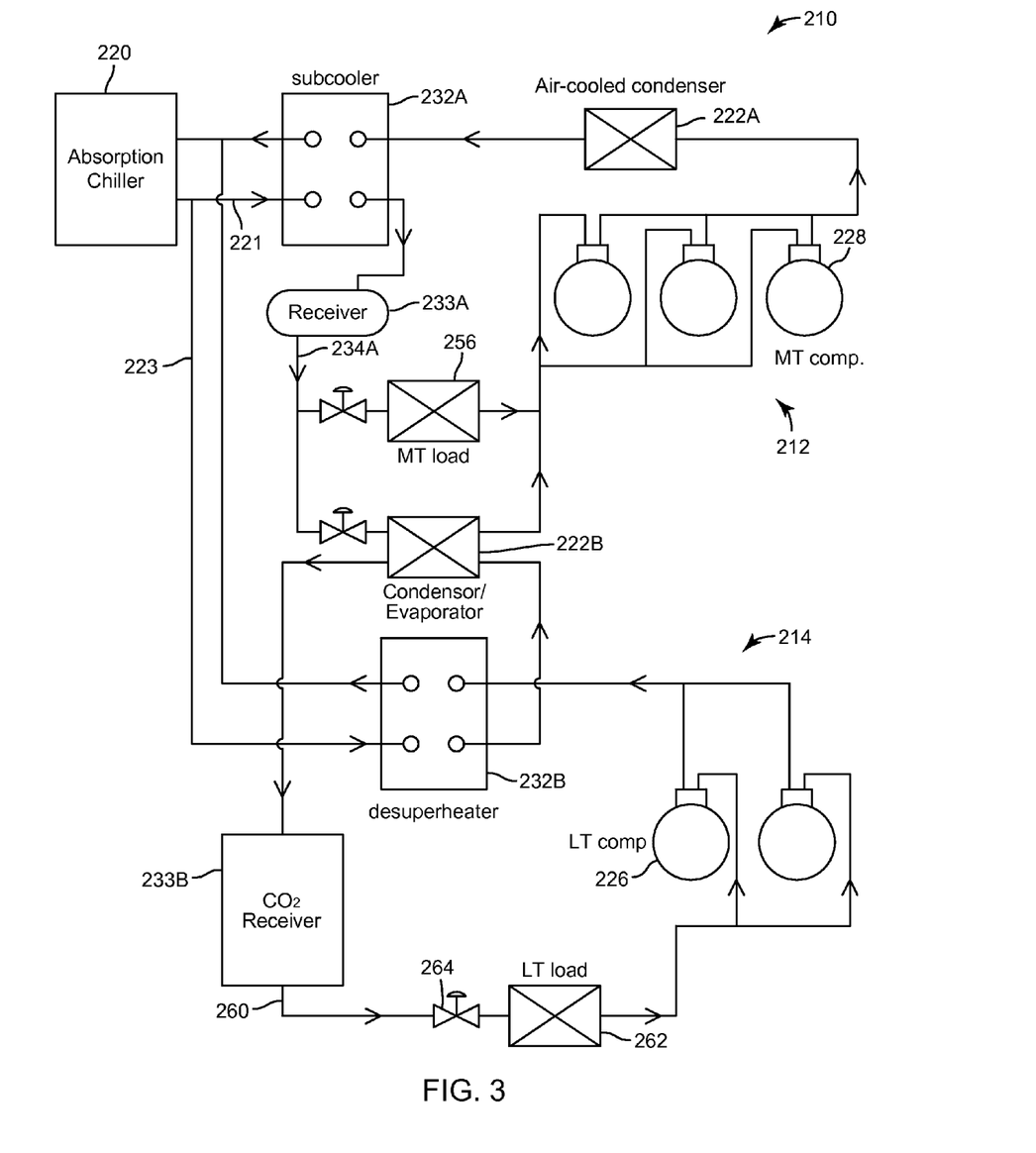
FIG. 3 is a schematic representation of a cascade refrigeration system having an LT portion with a CO2 refrigerant and an MT portion with a HFC refrigerant, and absorption chiller that receives a source of waste heat and provides cooling to sub-cool the compressed HFC refrigerant from an air-cooled condenser in the MT portion, and to pre-cool (e.g. de-superheat, etc.) a compressed CO2 refrigerant in the LT portion, according to yet another exemplary embodiment.

Referring to FIG. 3, a cascade refrigeration system 210 having an LT portion 214 with a CO2 refrigerant and an MT portion 212 with an HFC refrigerant, and absorption chiller 220 that receives waste heat from a nearby source and provides cooling to sub-cool the compressed HFC refrigerant from an air-cooled condenser 222 in the MT portion 212, and to pre-cool (e.g. de-superheat, etc.) a compressed CO2 refrigerant in the LT portion 214, according to yet another exemplary embodiment. The absorption chiller 220 has a first MT branch 221 that directs coolant through a circulating loop to an MT sub-cooler 232A that sub-cools the refrigerant that is condensed in the MT portion 212. The sub-cooled liquid refrigerant is then directed through a receiver 233A and a supply line 234 to MT loads 256 (e.g. MT refrigerated display cases, shown for simplicity as a single MT load, or glycol chiller to supply chilled glycol to MT refrigerated display cases, etc.) and to a cascade condenser/evaporator 222B to provide condensing of the CO2 refrigerant in the LT portion 214, where the HFC refrigerant on the MT portion 212 is evaporated to condense the CO2 refrigerant in the LT portion 214. Refrigerant gas from the MT loads 256 and from the cascade condenser/evaporator 222B is then directed to the suction of the MT compressors 228 to complete the MT refrigeration cycle. The absorption chiller 220 also has a second LT branch 223 that directs coolant through a circulating loop to an LT pre-cooler 232B that acts to de-superheat the hot CO2 refrigerant gas discharged from the LT compressors 214, before the CO2 refrigerant gas is routed through the cascade condenser/evaporator 222B. Pre-cooling of the hot CO2 refrigerant gas reduces the heat load on the cascade condenser/evaporator 222B, thus improving the thermal efficiency of the system. The condensed CO2 refrigerant is then directed through a receiver 233B and a supply line 260 to the LT loads 262 (e.g. LT freezer/display cases, shown for simplicity as a single LT load, etc.), and the vaporized refrigerant discharged from the LT loads 262 is directed back to the LT compressors 226 to complete the cycle for the LT portion 214 of the refrigeration system 210.

Figure 4:
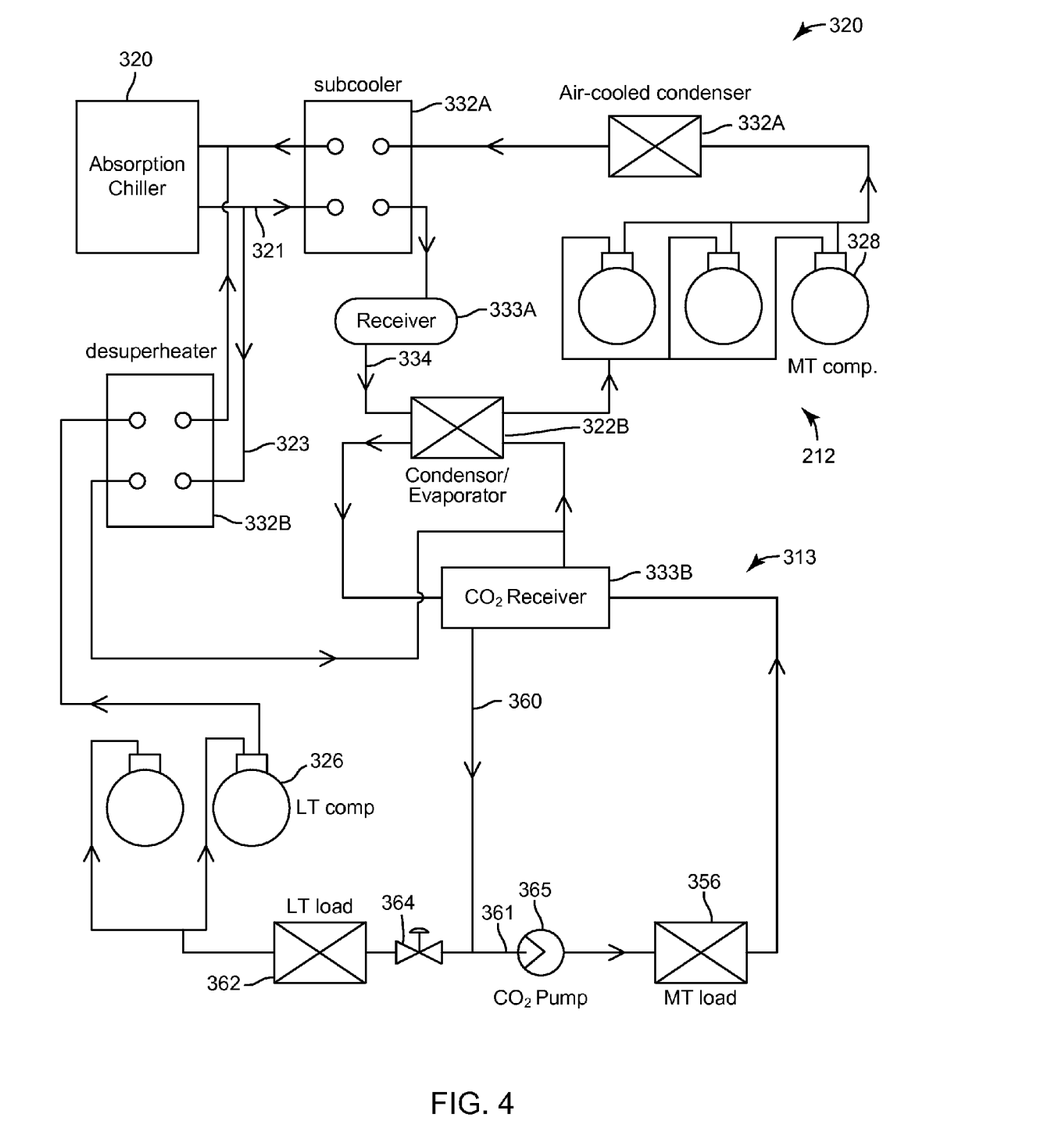
FIG. 4 is a schematic representation of another cascade refrigeration system having an LT portion with a compressed vapor-phase CO2 refrigerant, and the MT portion with a pumped liquid-phase secondary CO2 refrigerant, and the MT primary refrigeration portion with an HFC refrigerant, and an absorption chiller that receives a source of waste heat and provides cooling to sub-cool the compressed HFC refrigerant from an air-cooled condenser in the MT primary refrigeration portion, and to pre-cool (e.g. de-superheat, etc.) a compressed CO2 refrigerant in the LT portion, according to an exemplary embodiment.

Referring to FIG. 4, another cascade refrigeration system 310 having an LT portion 314 with a compressed vapor-phase CO2 refrigerant, and a MT secondary portion 313 with a pumped liquid-phase CO2 refrigerant, and a MT primary refrigeration portion 312 with a compressed vapor-phase HFC refrigerant, and an absorption chiller 320 that receives waste heat from a nearby source and provides cooling to sub-cool the compressed HFC refrigerant from an air-cooled condenser 332A in the MT primary refrigeration portion, and to pre-cool (e.g. de-superheat, etc.) a compressed CO2 refrigerant in the LT portion 314, according to an exemplary embodiment. The absorption chiller 320 has a first LT branch 323 that directs coolant through a circulating loop to an LT pre-cooler 332B that acts to de-superheat the hot CO2 refrigerant gas discharged from the LT compressors 326, before the CO2 refrigerant gas is routed through a cascade condenser/evaporator 322B. The condensed CO2 refrigerant is received in a CO2 receiver tank 333B where the liquid CO2 refrigerant is directed through an LT supply line 360 (e.g. having an expansion valve) to the LT loads 362. The liquid CO2 refrigerant is also directed to a supply line 361 for the MT secondary portion 313 where the liquid CO2 is pumped directly to an MT load 356 (e.g. MT refrigerated display cases, etc.). The CO2 refrigerant discharged from the MT loads 356 in the MT secondary portion is directed to the CO2 receiver tank 333B, where any liquid portion is retained in the CO2 receiver 333B, and any vapor portion is directed to the cascade condenser/evaporator 322B to be condensed and returned to the CO2 receiver 333B to complete the cycle.

Referring further to FIG. 4, the absorption chiller 320 also has a second MT branch 321 that directs coolant through a circulating loop to an MT sub-cooler 332A that sub-cools the HFC refrigerant that is condensed in the MT primary refrigeration portion 312. The sub-cooled liquid refrigerant is then directed through a receiver 333A and a supply line 334 to a cascade condenser/evaporator 322B to provide condensing of the CO2 refrigerant in the LT portion 314 and in the MT secondary portion 313, where the HFC refrigerant in the MT primary refrigeration portion 312 is evaporated to condense the CO2 refrigerant vapor from the LT portion 314 and the MT secondary portion 313 for return to the CO2 receiver 333B. HFC refrigerant gas from the cascade condenser/evaporator 322B in the MT primary refrigeration portion 312 is then directed to the suction of the MT compressors 328 to complete the MT refrigeration cycle.

The absorption chiller according to the illustrated embodiments may be any suitable type of absorption chiller. For example, the absorption chiller may be of a type having a system uses its "thermal" compressor (e.g. having a generator, absorber, pump and heat exchanger—not shown) to boil water vapor (refrigerant) out of a lithium bromide/water solution and compress the refrigerant vapor to a higher pressure. Increasing the refrigerant pressure also increases its condensing temperature. The refrigerant vapor condenses to a liquid at this higher pressure and temperature. Because this condensing temperature is hotter than the ambient temperature, heat moves from the condenser to the ambient air and is rejected. The high-pressure liquid then passes through a throttling valve that reduces its pressure. Reducing its pressure also reduces its boiling point temperature. The low-pressure liquid then passes into the evaporator and is boiled at this lower temperature and pressure. Because the boiling temperature is now lower than the temperature of the coolant circulating in the loop to the sub-cooler, heat moves from the coolant in the circulating loop into the evaporator and causes this liquid to boil. Removing heat from the coolant in the circulating loop in this manner causes the circulating coolant to be chilled (e.g. to a temperature as low as about 46° F. in some applications) for circulation back to the sub-cooler, pre-cooler or condenser (depending upon the application, or other location to provide cooling to portions of the refrigeration system). The refrigerant vapor then passes into the absorber where it returns to a liquid state as it is pulled into the lithium bromide solution (the absorption process). The diluted lithium bromide solution is pumped back to the generator. Because lithium bromide (the absorbent) does not boil, water (the refrigerant) is easily separated by adding heat. The resultant water vapor passes into the condenser, the absorbent solution returns to the absorber, and the process repeats.

A control system or device provides all the necessary control capabilities to operate the refrigeration system with absorption cooling. The control system or device interfaces with suitable instrumentation associated with the system and absorption cooling device, such as timing devices, pressure sensors, temperature sensors, etc. and provides appropriate output signals to components, such as valves, etc. to control the refrigerant and coolant pressure and flow within the system. According to any exemplary embodiment, the control system or device contemplates methods, systems and program products on any machine-readable media for accomplishing various operations including those described herein. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that the orientation of various elements may differ according to other exemplary embodiments, and that such variations are intended to be encompassed by the present disclosure.

It is also important to note that the construction and arrangement of the systems and methods for a refrigeration system with absorption cooling as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions.

What is claimed is:

1. A refrigeration system having absorption chilling, comprising:
    a low temperature portion and a medium temperature portion for circulating a $CO_2$ refrigerant;
    the low temperature portion comprising at least one low temperature compressor and at least one low temperature load;
    the medium temperature portion comprising at least one medium temperature compressor and at least one medium temperature load;
    a heat exchanger configured to cool or condense $CO_2$ refrigerant in a hot gas state from the medium temperature compressor;
    a sub-cooler configured to receive and cool the $CO_2$ refrigerant from the heat exchanger;
    an absorption chiller configured to receive waste heat from a source and provides cooling to the $CO_2$ refrigerant in the sub-cooler;
    a flash tank configured to receive the cooled $CO_2$ refrigerant from the sub-cooler;
    a $CO_2$ refrigerant vapor line communicating between a vapor portion of the flash tank and a suction side of the medium temperature compressor; and
    a $CO_2$ refrigerant liquid line communicating between the flash tank and at least one of the medium temperature load and the low temperature load.

2. The refrigeration system of claim 1 wherein $CO_2$ refrigerant discharged from the one of the medium temperature load and the low temperature load is directed to a suction side of the low temperature compressor, and $CO_2$ refrigerant discharged from the low temperature compressor is directed to the suction side of the medium temperature compressor.

3. The refrigeration system of claim 2 further comprising an expansion valve configured to expand the $CO_2$ refrigerant entering the flash tank.

4. The refrigeration system of claim 3 further comprising a control valve configured to direct the liquid $CO_2$ refrigerant from the flash tank into the medium temperature load.

5. The refrigeration system of claim 4 further comprising an expansion valve configured to expand the liquid $CO_2$ refrigerant from the flash tank into vapor and into the low temperature load.

6. A refrigeration system having absorption chilling, comprising:
    a low temperature portion and a medium temperature portion for circulating an HFC refrigerant,
    the low temperature portion comprising at least one low temperature compressor and at least one low temperature load, and at least one air-cooled low temperature condenser having a bypass valve, the air-cooled low temperature condenser configured to cool refrigerant in a hot gas state from the low temperature compressor;
    the medium temperature portion comprising at least one medium temperature compressor and at least one medium temperature load, and at least one air-cooled medium temperature condenser configured to cool refrigerant in a hot gas state from the medium temperature compressor;

a medium temperature sub-cooler configured to receive and cool the refrigerant from the air-cooled medium temperature condenser;

a low temperature condenser/sub-cooler configured to receive and cool the refrigerant from the air-cooled low temperature condenser or directly from the low temperature compressor via the bypass valve;

an absorption chiller configured to receive waste heat from a source and provide cooling to the refrigerant in the medium temperature sub-cooler and to the refrigerant in the low temperature condenser/sub-cooler;

wherein the low temperature condenser/sub-cooler is configured as a primary source of condensing for refrigerant from the low temperature compressors, and the air-cooled low temperature condenser is configured to serve as a back-up for condensing the refrigerant from the low temperature compressors.

7. A cascade refrigeration system having absorption chilling, comprising:

a low temperature portion for circulating a CO2 refrigerant and a medium temperature portion for circulating an HFC refrigerant, the low temperature portion comprising at least one low temperature compressor and at least one low temperature load;

the medium temperature portion comprising at least one medium temperature compressor and at least one medium temperature load, and at least one air-cooled medium temperature condenser configured to cool refrigerant in a hot gas state from the medium temperature compressor;

a medium temperature sub-cooler configured to receive and cool the refrigerant from the air-cooled medium temperature condenser;

a low temperature desuperheater configured to receive and cool the refrigerant from the low temperature compressor;

an absorption chiller configured to receive waste heat from a source and provide cooling to the HFC refrigerant in the medium temperature sub-cooler and to the CO2 refrigerant in the low temperature desuperheater;

a heat exchanger configured to receive the HFC refrigerant from the medium temperature subcooler and to receive the CO2 refrigerant from the low temperature desuperheater, so that the HFC refrigerant cools the CO2 refrigerant.

8. The cascade refrigeration system of claim 7 wherein the heat exchanger is a cascade heat exchanger configured in parallel with the medium temperature load and operable to evaporate the HFC refrigerant for return to the medium temperature compressor and to condense the CO2 refrigerant for return to a CO2 receiver.

9. The cascade refrigeration system of claim 8 wherein liquid CO2 refrigerant from the CO2 receiver is configured to be vaporized in the low temperature load and directed to a suction of the low temperature compressor.

10. A refrigeration system having absorption chilling, comprising:

a low temperature portion for circulating a CO2 refrigerant, a medium temperature primary portion for circulating an HFC refrigerant, and a medium temperature secondary portion for circulating a CO2 refrigerant;

the low temperature portion comprising at least one low temperature compressor and at least one low temperature load;

the medium temperature primary portion comprising at least one medium temperature compressor and at least one air-cooled medium temperature condenser configured to cool HFC refrigerant in a hot gas state from the medium temperature compressor;

the medium temperature secondary portion including at least one CO2 refrigerant pump for circulating CO2 refrigerant in a liquid state to at least one medium temperature load;

a medium temperature sub-cooler configured to receive and cool the HFC refrigerant from the air-cooled medium temperature condenser;

a low temperature desuperheater configured to receive and cool the CO2 refrigerant from the low temperature compressor;

an absorption chiller configured to receive waste heat from a source and to provide cooling to the HFC refrigerant in the medium temperature sub-cooler and to the CO2 refrigerant in the low temperature desuperheater;

a heat exchanger configured to receive the HFC refrigerant from the medium temperature subcooler and to receive the CO2 refrigerant from the low temperature desuperheater, so that the HFC refrigerant condenses the CO2 refrigerant;

a CO2 receiver configured to receive liquid CO2 refrigerant from the heat exchanger;

a CO2 refrigerant liquid line having a first branch configured to direct liquid CO2 refrigerant for expansion to the low temperature load, and a second branch configured to direct liquid CO2 refrigerant to the CO2 refrigerant pump for circulation of the liquid CO2 refrigerant to the medium temperature load in the medium temperature secondary portion.

* * * * *